(12) United States Patent
Kim (10) Patent No.: US 11,827,282 B2
(45) Date of Patent: Nov. 28, 2023

(54) COMPONENT PRODUCED BY WELDING AND METHOD OF PRODUCING SAME

(71) Applicants: Hyundai Motor Company, Seoul (KR); Kia Motors Corporation, Seoul (KR)

(72) Inventor: Ki Eun Kim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 540 days.

(21) Appl. No.: 16/931,647

(22) Filed: Jul. 17, 2020

(65) Prior Publication Data

US 2021/0188367 A1 Jun. 24, 2021

(30) Foreign Application Priority Data

Dec. 20, 2019 (KR) .................. 10-2019-0171618

(51) Int. Cl.
| | | |
|---|---|---|
| B62D 33/023 | (2006.01) | |
| B23K 26/323 | (2014.01) | |
| B23K 26/242 | (2014.01) | |
| B23K 3/08 | (2006.01) | |
| B23K 1/005 | (2006.01) | |
| B23K 101/00 | (2006.01) | |
| B23K 103/10 | (2006.01) | |

(52) U.S. Cl.
CPC .......... *B62D 33/023* (2013.01); *B23K 1/0056* (2013.01); *B23K 3/08* (2013.01); *B23K 26/242* (2015.10); *B23K 26/323* (2015.10); *B23K 2101/006* (2018.08); *B23K 2103/10* (2018.08)

(58) Field of Classification Search
None
See application file for complete search history.

(56) References Cited

FOREIGN PATENT DOCUMENTS

| JP | 5206284 B2 * | 6/2013 |
| KR | 100812414 B1 | 3/2008 |

\* cited by examiner

*Primary Examiner* — Daniel J. Schleis
(74) *Attorney, Agent, or Firm* — Slater Matsil, LLP (57) ABSTRACT

A component includes a first part in which a first junction part is configured, a second part in which a second junction part and a cross junction part intersecting the second junction part are configured. The second junction part and the first junction part are welded at a preceding weld. The component also includes a third part in which a third junction part is configured. A part of the third junction part is overlapped with an opposite part of the first junction part, a remaining part of the third junction part is overlapped with the cross junction part, and the first part and the second part are welded to the third part at a following weld at each of the overlapped parts.

20 Claims, 10 Drawing Sheets

COMPONENT PRODUCED BY WELDING AND METHOD OF PRODUCING SAME

CROSS-REFERENCE TO RELATED APPLICATIONS

This application claims priority to Korean Patent Application No. 10-2019-0171618, filed on Dec. 20, 2019, which application is hereby incorporated herein by reference.

TECHNICAL FIELD

The present invention relates to a component produced by welding and a method of producing the same.

BACKGROUND

When welding panels of steel or aluminum, or panels made of different materials from each other, laser brazing welding may be used depending on welding quality assurance and exterior design needs.

However, in a case of laser brazing welding, since a thin panel is to be used, it is difficult to secure rigidity of the panel material itself. Also, there is a possibility of deformation by external force clamping the thin panel for welding. Since the two panels are pressurized against each other, spring back may occur after welding. In particular, when welding lines of three or more panels are welded by being intersected with each other, two or more welding lines intersect each other. Due to the overlapping of the welding at the intersection point, thermal stress becomes excessive, and thus there is a problem in that the deformation occurs at the welding position of the panel, and a pinhole is generated when the thermal stress is severe.

In order to solve this problem, it is necessary to avoid welding parts being overlapped. However, in this case, there is a problem in that realization of a design for a desired product becomes difficult. Thus, there is a requirement for a technology capable of preventing welding defects while securing the design of a product as desired.

The foregoing is intended merely to aid in the understanding of the background of the present invention, and is not intended to mean that the present invention falls within the purview of the related art that is already known to those skilled in the art.

SUMMARY

The present invention relates to a component produced by welding and a method of producing the same. Particular embodiments relate to preventing a defect of a welding area from occurring when producing by welding a plurality of panels having welding lines to be intersected with each other through laser brazing welding and the like.

Embodiments of the present invention provide a component produced by welding, the component including a first part in which a first junction part is configured, a second part in which a second junction part and a cross junction part intersecting the second junction part are configured, the second junction part is coupled to the first part such that a part of the first junction part and the second junction part are overlapped, and preceding weld is performed for the second junction part and the first junction part, and a third part in which a third junction part is configured, a part of the third junction part is overlapped with an opposite part of the first junction part, a remaining part of the third junction part is overlapped with the cross junction part, and the first part and the second part are coupled to the third part by performing following weld for each of the overlapped parts, wherein a rigidity-reinforcing part is formed on the first part, the second part, or the third part adjacent to a point where the preceding weld and the following weld intersect each other.

The preceding weld and the following weld may be laser welding.

The first junction part, the second junction part and the cross junction part, and the third junction part may be respectively configured on a first flange, a second flange, and a third flange respectively formed along edges of the first part, the second part, and the third part.

The first part, the second part, and the third part may be made of same or different metals.

The second junction part and the cross junction part may be configured by dividing a section along an edge of the second part, whereby the second junction part and the cross junction part may intersect each other at a point where the second junction part and the cross junction part may meet each other.

The rigidity-reinforcing part may be in a groove shape recessed to a certain depth.

The rigidity-reinforcing part may be formed at a position between the second junction part and the cross junction part, the position being where the second junction part and the cross junction part may meet each other in the second part.

The rigidity-reinforcing part may be formed at a position inclined toward the second junction part between the second junction part and the cross junction part.

The rigidity-reinforcing part may be positioned to be inclined toward the second junction part from a point between the second junction part and the cross junction part, and may be in a groove shape recessed to a certain depth so as to be connected to the second junction part.

In the second part, the second junction part and the cross junction part may be spaced apart from each other at all points except points where the second junction part and the cross junction part may meet each other, and a plurality of rigidity-reinforcing parts may be formed at a certain interval between the second junction part and the cross junction part spaced apart from each other.

A sealer may be filled in a recess of the rigidity-reinforcing part.

The sealer may be connected to a pinhole formed at the point where the preceding weld and the following weld may intersect each other, and may be filled in the pinhole.

The first part may be an upper panel of an outer panel assembly of a tailgate of a vehicle, the third part may be a lower panel of the outer panel assembly of the tailgate, and the second part may be an extension panel disposed between the upper and lower panels of the outer panel assembly of the tailgate.

In the first part and the third part, both side ends thereof may be welded to each other, a central part therebetween may be spaced apart from each other, the second part may be disposed in the central part, and the preceding weld and the following weld may intersect each other at an acute angle at a point where the first part, the second part, and the third part may intersect each other.

A method of producing a component of embodiments of the present invention may include forming a rigidity-reinforcing part on a first part, a second part, or a third part adjacent to a point where a preceding weld and a following weld may intersect each other, coupling the first part and the second part to each other by performing the preceding weld in a state of overlapping and pressurizing a part of a first junction part and a second junction part, and coupling the first part, the second part, and the third part to each other by pressurizing and performing the following weld while overlapping a part of a third junction part with an opposite part of the first junction part and overlapping a remaining part of the third junction part with a cross junction part.

According to the component produced by welding and the method of producing the same of embodiments of the present invention, it is possible to prevent a defect of a welding area from occurring when producing by welding a plurality of panels having welding lines intersecting each other through laser brazing welding and the like.

DETAILED DESCRIPTION OF ILLUSTRATIVE EMBODIMENTS

Figure 1:
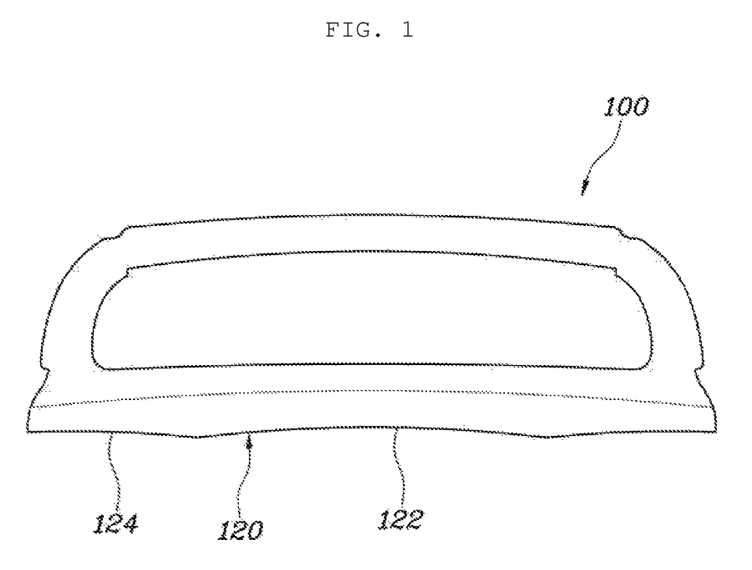
FIGS. 1 to 3 are views showing a first part, a second part, and a third part of a component produced by welding according to an exemplary embodiment of the present invention.
Figure 2:
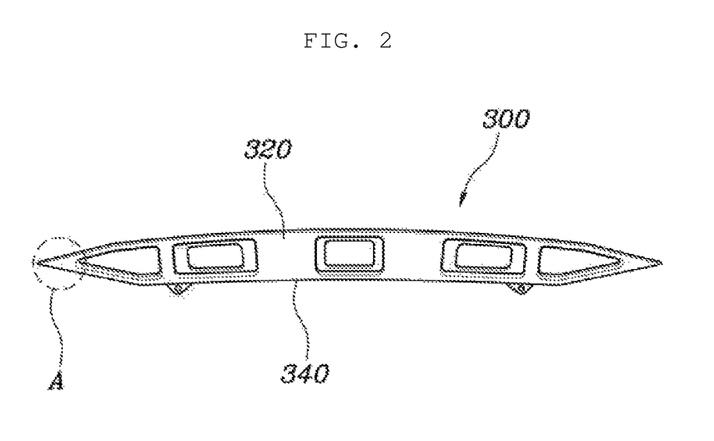
Figure 3:
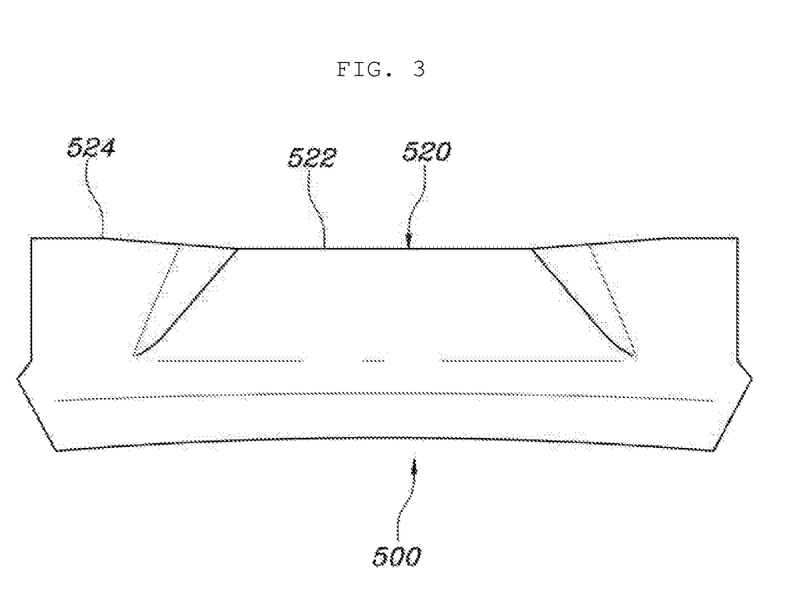
Figure 4:
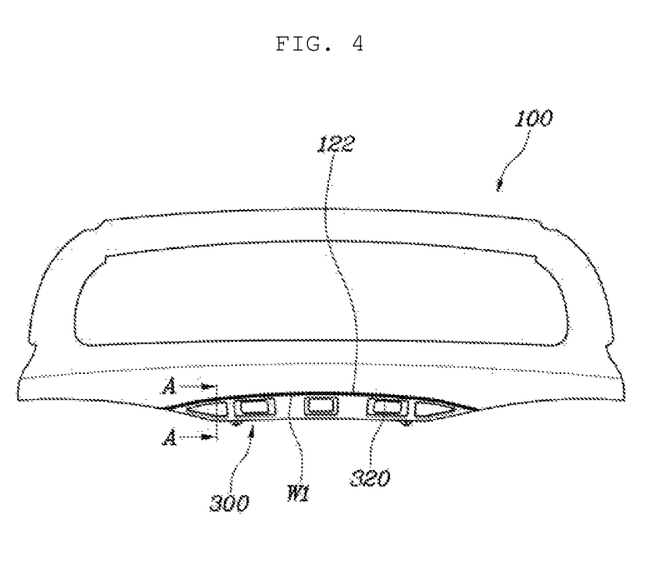
FIG. 4 is a view showing a state in which a first part and a second part of a component produced by welding according to an exemplary embodiment of the present invention are coupled to each other.
Figure 5:
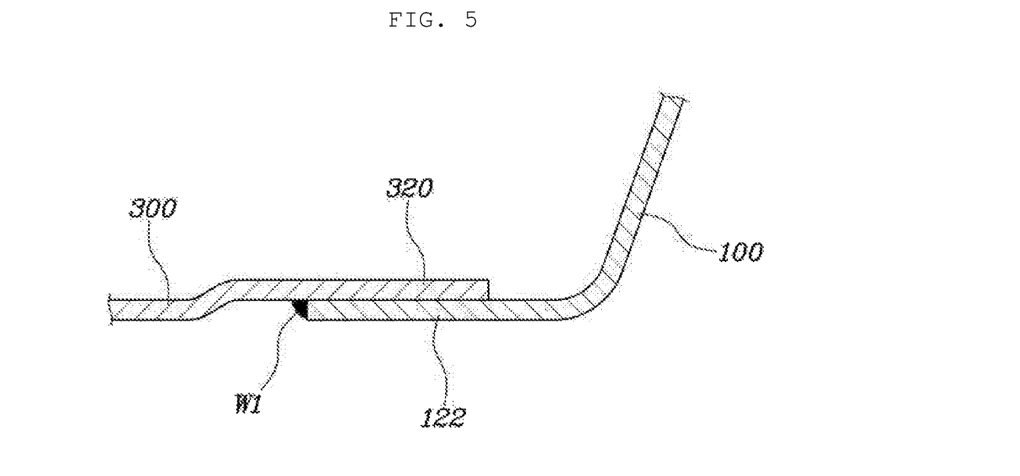
FIG. 5 is a cross-sectional view taken along line A-A of the component shown in FIG. 4.
Figure 6:
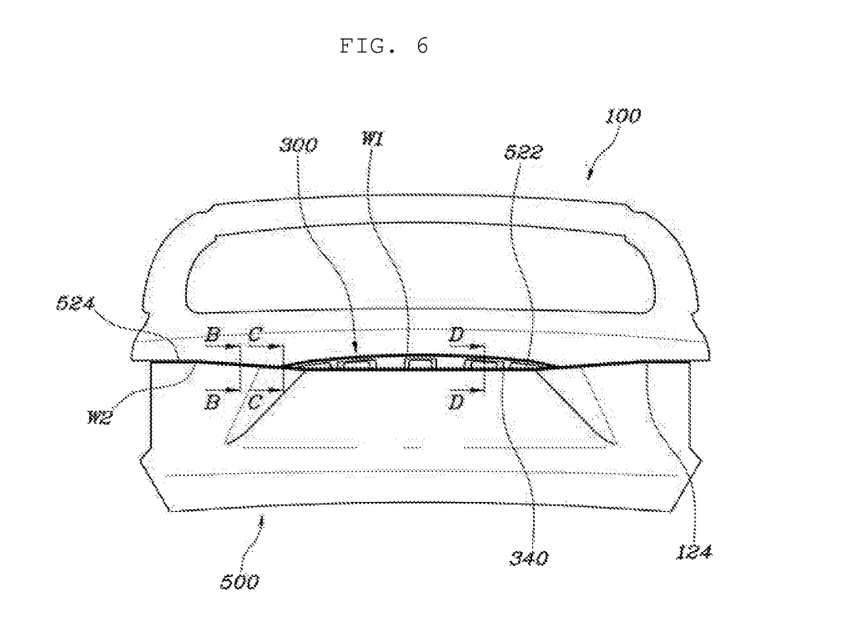
FIG. 6 is a view showing a state in which all components produced by welding according to an exemplary embodiment of the present invention are coupled to each other.
Figure 7:
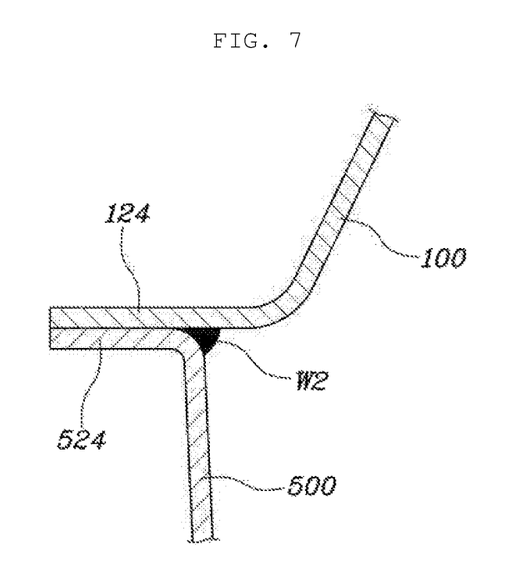
FIG. 7 is a cross-sectional view taken along line B-B of the component shown in FIG. 6.
Figure 8:
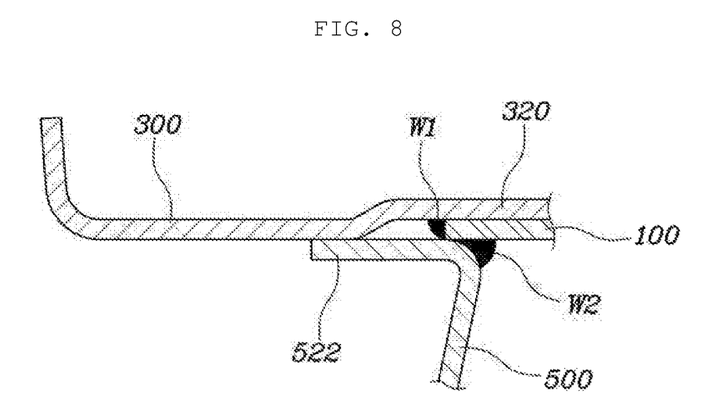
FIG. 8 is a cross-sectional view taken along line C-C of the component shown in FIG. 6.
Figure 9:
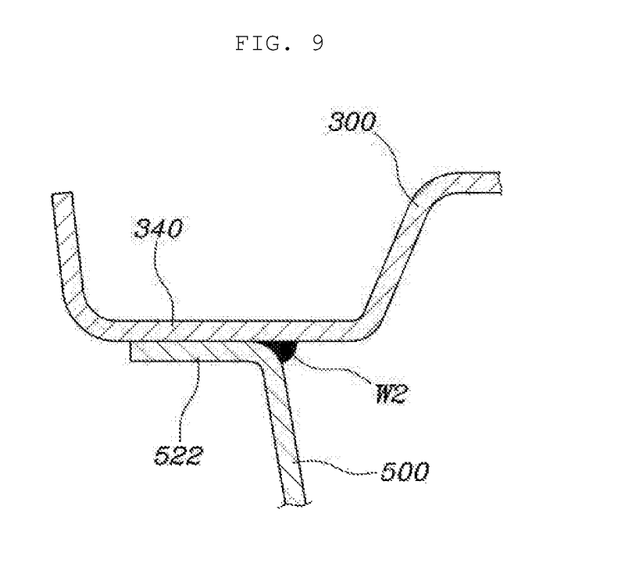
FIG. 9 is a cross-sectional view taken along line D-D of the component shown in FIG. 6.
Figure 10:
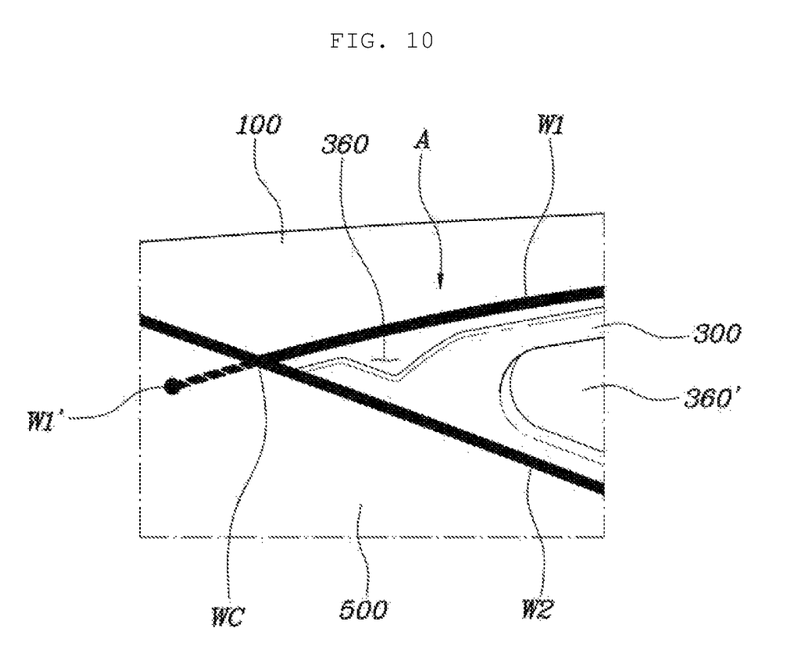
FIG. 10 is an enlarged view of a portion of the second part at line A-A shown in FIG. 2.

FIGS. 1 to 3 are views showing a first part, a second part, and a third part of a component produced by welding according to an exemplary embodiment of the present invention. FIG. 4 is a view showing a state in which a first part and a second part of a component produced by welding according to an exemplary embodiment of the present invention are coupled to each other. FIG. 5 is a cross-sectional view taken along line A-A of the component shown in FIG. 4. FIG. 6 is a view showing a state in which all components produced by welding according to an exemplary embodiment of the present invention are coupled to each other. FIG. 7 is a cross-sectional view taken along line B-B of the component shown in FIG. 6. FIG. 8 is a cross-sectional view taken along line C-C of the component shown in FIG. 6. FIG. 9 is a cross-sectional view taken along line D-D of the component shown in FIG. 6. FIG. 10 is an enlarged view of a portion of the second part at line A-A shown in FIG. 2.

Embodiments of the present invention relates to a component produced by welding and a method of producing the same, which may prevent a defect of a welding area from occurring when producing by welding a plurality of panels having welding lines intersecting each other through laser brazing welding and the like.

FIGS. 1 to 3 are views showing the first part 100, the second part 300 and the third part 500 of the component produced by welding according to an exemplary embodiment of the present invention. The component produced by welding includes the first part 100 in which a first junction part 120 is configured, a second part 300 in which a second junction part 320 and a cross junction part 340 intersecting the second junction part 320 are configured, the first part 100 is coupled to the second part such that a part 122 of the first junction part and the second junction part 320 are overlapped, and a preceding weld W1 is performed for the second junction part 320 and the first junction part 120, and a third part 500 in which a third junction part 520 is configured, a part 524 of the third junction part 520 is overlapped with an opposite part 124 of the first junction part, a remaining part 522 of the third junction part 520 and the cross junction part 340 are overlapped, and the first part 100 and the second part 300 are coupled to each other by which a following weld W2 is performed for each of the overlapped parts, wherein a rigidity-reinforcing part 360 is formed in the first part 100, the second part 300, or the third part 500 adjacent to a point where the preceding weld W1 and the following weld W2 intersect each other.

Particularly, an embodiment of the present invention is a case where three parts are put together to form a singular component assembly, and for example, the panels are joined together by welding.

An exemplary embodiment to which the present invention may be applied is an outer panel assembly forming an outer surface of a tailgate of a vehicle, wherein the first part 100 is an upper panel of the outer panel assembly of the tailgate of the vehicle, the third part 500 is a lower panel of the outer panel assembly of the tailgate, and the second part 300 may be an extension panel disposed between the upper panel and lower panels of the outer panel assembly of the tailgate. However, the technical idea of the present invention is not only applied to the tailgate, but is applicable to a door panel or various exterior panels of a vehicle, and further, to various industrial components.

In embodiments of the present invention, since a thin panel is to be used, it is difficult to secure rigidity of the panel material itself, and thus there is a possibility of having deformation by external force clamping the thin panel for welding. In addition, in embodiments of the present invention, the preceding weld W1 and the following weld W2 may be laser welding. In detail, laser brazing welding may be corresponded to the case above. In this case, when the welding lines intersect each other at WC, thermal stress becomes excessive so that deformation occurs and a pinhole may be generated due to an excessive spring back phenomenon. Therefore, in order to solve this problem, embodiments of the present invention propose a structure for preventing the deformation and welding defects by providing more rigidity to a panel through change of the panel shape.

Particularly, FIG. 1 shows the first part 100, and the first junction part 120 is configured at a lower end of the first part 100 as shown. FIG. 2 shows the second part 300, and the second junction part 320 is configured at the upper end of the second part 300, and the cross junction part 340 intersecting the second junction part 320 is configured at the lower end thereof. As shown in FIG. 4, the second part 300 is coupled to the first part 100 such that a part 122 of the first junction part and the second junction part 320 are overlapped with each other. Then, the preceding weld W1 is performed for the second junction part 320 and the first junction part 120.

FIG. 3 shows the third part 500, and the third junction part 520 is configured in the third part 500. As shown in FIG. 6, a part 524 of the third junction part 520 and an opposite part 124 of the first junction part 120 are overlapped with each other, the remaining part 522 of the third junction part 520 and the cross junction part 340 are overlapped with each other, and the following weld W2 is performed for each of the overlapped parts, whereby the first part 100 and the second part 300 are coupled to the third part 500. Through this process, the first part 100, the second part 300, and the third part 500 are coupled to each other by welding.

In this case, there is no problem when welding lines are not crossed with each other. However, at the point WC where the preceding weld W1 and the following weld W2 intersect each other, the deformation and thermal stress of the material due to clamping are excessive, so that the breakage of the material or a pinhole may occur due to the spring back phenomenon. Accordingly, the rigidity-reinforcing part 360 is formed in the first part 100, the second part 300, or the third part 500 adjacent to the point where the preceding weld W1 and the following weld W2 intersect each other.

The rigidity-reinforcing part 360 is provided for imparting rigidity to a material in order to prevent the spring back phenomenon after welding of the material due to pressure applied during the welding, provided for preventing poor quality caused by the spring back due to the thermal stress after the welding, and also provided for overcoming a problem such as having a step difference generated by the spring back when performing the following weld W2. In particular, in the case when the pinhole is generated, the rigidity-reinforcing part 360 may be utilized to fill the pinhole with a sealer and the like, so that a painted surface may be kept smooth when subsequent painting is performed.

Particularly, the first junction part 120, the second junction part 320 and the cross junction part 340, and the third junction part 520 may be respectively configured at the first flange, the second flange, and the third flange respectively formed along the edges of the first part 100, the second part 300, and the third part 500. The first flange, the second flange, and the third flange are formed into a surface shape having a predetermined area by bending the edge part of the panel. Also, the first flange, the second flange, and the third flange are to play the roles of the first junction part 120, the second junction part 320 and the cross junction part 340, and the third junction part 520, respectively.

In addition, the first part 100, the second part 300, and the third part 500 may be made of the same or different metal materials. Particularly, in the case of aluminum, the bonding is performed through laser welding or the like. Aluminum has a good flexible rate, but is also susceptible to breakage, and thus effective results may be obtained when embodiments of the present invention are applied.

Meanwhile, the second junction part 320 and the cross junction part 340 are configured by dividing a section along the edge of the second part 300 as shown in FIG. 2, whereby the second junction part 320 and the cross junction part 340 may intersect each other at a point where the second junction part 320 and the cross junction part 340 meet each other. The illustrated exemplary embodiment is a case where the second junction part 320 and the cross junction part 340 configure points by meeting each other at both ends of the second part 300.

In addition, the rigidity-reinforcing part 360 may be in a groove shape recessed to a certain depth as shown in FIG. 10. The rigidity-reinforcing part 360 may be formed at a point between the second junction part 320 and the cross junction part 340, which is a point where the second junction part 320 and the cross junction part 340 meet each other in the second part 300. In particular, as shown in the drawings, the rigidity-reinforcing part 360 may be formed at a point inclined toward the second junction part 320 from a point between the second junction part 320 and the cross junction part 340.

Particularly, the rigidity-reinforcing part 360 is positioned to be inclined toward the second junction part 320 from a point between the second junction part 320 and the cross junction part 340, and may be in a groove shape recessed to a certain depth so as to be connected to the second junction part 320. In addition, the sealer may be filled in the recess of the rigidity-reinforcing part 360. In the case of the sealer, the sealer is to be applied to a target part by using a sealer gun, but there is a problem in that the sealer gun does not reach a narrow point described as in embodiments of the present invention. In addition, since control of applying a small amount of sealer is practically difficult, a certain amount of more sealer is inevitably applied. Due to this problem, a phenomenon occurs, where a sealer is applied to any area other than a desired area like a pinhole, thereby causing a problem in that the subsequent coating becomes poor in quality. In the case of embodiments of the present invention, even when slightly excessive sealer is applied, the groove may be filled by applying the sealer first to the recess of the rigidity-reinforcing part 360, thereby preventing a defect on a coating surface. Also, even when a pinhole is generated, the pinhole may be filled and prevented by spreading some of the filled sealer to a side. Even when the pinhole or the like is generated, the sealer may be prevented at a point where the preceding weld W1 and the following weld W2 intersect each other.

Meanwhile, in the second part 300, the second junction part 320 and the cross junction part 340 are spaced apart from each other at all points except points where the second junction part 320 and the cross junction part 340 meet each other, and a plurality of rigidity-reinforcing parts 360 and 360' may be formed at a certain interval between the second junction part 320 and the cross junction part 340 spaced apart from each other.

Particularly, a method of producing the component includes forming a rigidity-reinforcing part 360 on the first part 100, the second part 300, or the third part 500 adjacent to a point where the preceding weld W1 and the following weld W2 intersect each other, coupling the first part 100 and the second part 300 to each other by performing the preceding weld W1 in a state of overlapping and pressurizing a part 122 of the first junction part and the second junction part 320, and coupling the first part 100, the second part 300, and the third part 500 to each other by pressurizing and performing the following weld W2 while overlapping a part 524 of the third junction part with the opposite part 124 of the first junction part and overlapping the remaining part 522 of the third junction part with the cross junction part 340.

First, as shown in FIG. 10, a method performs forming the rigidity-reinforcing part 360 disposed in the first part 100, the second part 300, or the third part 500 adjacent to the point where the preceding weld W1 and the following weld W2 intersect each other.

In addition, as shown in FIG. 4, the method performs coupling the first part 100 and the second part 300 to each other by the preceding weld W1 in a state where the part 122 of the first junction part 120 and the second junction part 320 are overlapped and pressurized. In this step, the part 122 of the first junction part 120 and the second junction part 320 are overlapped with each other, and the two junction parts are tightly fitted by pressing up and down through a jig or the like. In this state, laser brazing welding is performed as shown in the cross section of FIG. 5. Through this method, a bond is made between the tailgate outer upper panel and the extension panel. In addition, the tailgate outer upper panel and the extension panel are coupled to each other at an angle of almost 90 degrees as shown in the drawings, thereby having excellent exterior design despite low formability.

In addition, as shown in FIG. 6, the part 524 of the third junction part 520 is overlapped with the opposite part 124 of the first junction part 120, and the remaining part 522 of the third junction part 520 is overlapped with the cross junction part 340. In this state, by pressurizing the overlapped parts and performing the following weld W2, coupling of the first part 100, the second part 300, and the third part 500 is performed, and thus the assembly is completed.

FIG. 7 is a cross-sectional view taken along the line B-B of the component shown in FIG. 6. FIG. 8 is a cross-sectional view taken along the line C-C of the component shown in FIG. 6. FIG. 9 is a cross-sectional view taken along the line D-D of the component shown in FIG. 6.

As such, the following weld W2 is performed in the state where the part 524 of the third junction part 520 and the remaining part 124 of the first junction part 120 are overlapped and pressurized as shown in FIG. 7. In addition, the remaining part 522 of the third junction part 520 is pressurized while being overlapped with the cross junction part 340 and the following weld W2 is performed as shown in FIG. 9. Such following weld W2 occurs continuously at one time as a single process. In this case, as shown in FIG. 8, a point where the following weld W2 and the preceding weld W1 intersect each other is generated, and at this point, a quality problem such as having pinholes and the like may arise.

In order to solve this problem, embodiments of the present invention form the rigidity-reinforcing part 360 in the second part 300 in advance, as shown in FIG. 10. The rigidity-reinforcing part 360 may be positioned to be inclined toward the second junction part 320 from a point between the second junction part 320 and the cross junction part 340. Particularly, the rigidity-reinforcing part 360 may be in a groove shape recessed to a certain depth to be connected to the second junction part 320. In addition, the sealer may be filled in the recess of the rigidity-reinforcing part 360. Even when a pinhole is formed at the point WC where the preceding weld W1 and the following weld W2 intersect each other, the sealer is capable of being filled in the pinhole when the pinhole is required to be filled up manually. In a case when the sealer is to be filled in the pinhole generated without the rigidity-reinforcing part 360, the remains of the sealer may protrude convexly during the subsequent painting, which may cause a problem in the coating quality.

Particularly, FIG. 6 is a view showing a state in which all components produced by welding according to an exemplary embodiment of the present invention are coupled to each other. FIG. 10 is an enlarged view of a portion of the line A-A of the second part 300 shown in FIG. 2. As such, in the first part 100 and the third part 500, both side ends thereof are welded to each other, a central part therebetween spaces the first part 100 and the third part 500 from each other, the second part 300 is disposed at the central part, and the preceding weld W1 and the following weld W2 intersect each other at an acute angle at the point where the first part 100, the second part 300, and the third part 500 intersect each other. As described above, in the case of a point forming the acute angle, the welded parts are configured to be close to each other. Thus, based on the intersecting point WC, a great deal of stress is applied to the parts. Therefore, by securing the rigidity in advance through the forming of the rigidity-reinforcing part 360, it is possible to assure the quality of welding and painting.

In addition, the following weld W2 may intersect across a point spaced apart with a certain distance from the end point of the preceding weld W1. When the following weld W2 intersects at the end point of the preceding weld W1, a lifting phenomenon may occur when coupling the third part 500 due to the humped part of weld bead generated by the preceding weld W1. Accordingly, this problem may be solved by allowing the following weld W2 to intersect across a point spaced apart with a certain distance from the end point W1' of the preceding weld W1.

According to embodiments of the present invention, the component produced by welding and the method of producing the same may prevent a defect of a welding area from occurring when producing by welding a plurality of panels having welding lines intersecting each other through laser brazing welding and the like.

Although preferred embodiments of the present invention have been described for illustrative purposes, those skilled in the art will appreciate that various modifications, additions and substitutions are possible, without departing from the technical scope and spirit of the invention as disclosed in the accompanying claims.

What is claimed is:

1. A component produced by welding, the component comprising:
   a first part in which a first junction part is configured;
   a second part in which a second junction part and a cross junction part intersecting the second junction part are configured, the second junction part being coupled to the first part such that a part of the first junction part and the second junction part are overlapped, and the second junction part and the first junction part are welded at a preceding weld; and
   a third part in which a third junction part is configured, a part of the third junction part is overlapped with an opposite part of the first junction part, a remaining part of the third junction part is overlapped with the cross junction part, and the first part and the second part are welded to the third part at a following weld at each of the overlapped parts, wherein a rigidity-reinforcing part is formed on the first part, the second part, or the third part adjacent to a point where the preceding weld and the following weld intersect each other, and wherein the rigidity-reinforcing part is in a groove shape recessed to a certain depth.

2. The component of claim 1, wherein the preceding weld and the following weld are laser welds.

3. The component of claim 1, wherein the first junction part, the second junction part and the cross junction part, and the third junction part are respectively configured on a first flange, a second flange, and a third flange respectively formed along edges of the first part, the second part, and the third part.

4. The component of claim 1, wherein the first part, the second part, and the third part are each made of same or at least one of the first part, the second part, or the third part is made of a different metal than others of the first part, the second part, and the third part.

5. The component of claim 1, wherein the second junction part and the cross junction part are configured by dividing a section along an edge of the second part, whereby the second junction part and the cross junction part intersect each other at a point where the second junction part and the cross junction part meet each other.

6. The component of claim 1, wherein a sealer is filled in a recess of the rigidity-reinforcing part.

7. The component of claim 6, wherein the sealer is connected to a pinhole formed at the point where the preceding weld and the following weld intersect each other, and is filled in the pinhole.

8. The component of claim 1, wherein the rigidity-reinforcing part is formed at a position between the second junction part and the cross junction part, the position being where the second junction part and the cross junction part meet each other in the second part.

9. The component of claim 8, wherein the rigidity-reinforcing part is formed at a position inclined toward the second junction part between the second junction part and the cross junction part.

10. The component of claim 8, wherein the rigidity-reinforcing part is positioned to be inclined toward the second junction part from a point between the second junction part and the cross junction part, and is in a groove shape recessed to a certain depth so as to be connected to the second junction part.

11. The component of claim 1, wherein, in the second part, the second junction part and the cross junction part are spaced apart from each other at all points except points where the second junction part and the cross junction part meet each other, and a plurality of rigidity-reinforcing parts is formed at a certain interval between the second junction part and the cross junction part spaced apart from each other.

12. The component of claim 1, wherein the first part is an upper panel of an outer panel assembly of a tailgate of a vehicle, the third part is a lower panel of the outer panel assembly of the tailgate, and the second part is an extension panel disposed between the upper panel and the lower panel of the outer panel assembly of the tailgate.

13. The component of claim 12, wherein in the first part and the third part, both side ends thereof are welded to each other, a central part therebetween spaces the first part and the third part from each other, the second part is disposed in the central part, and the preceding weld and the following weld intersect each other at an acute angle at a point where the first part, the second part, and the third part intersect each other.

14. A tailgate comprising:
an upper panel of an outer panel assembly, the upper panel having a first junction part;
a lower panel of the outer panel assembly, the lower panel having a second junction part, a part of the second junction part being overlapped with an opposite part of the first junction part;
an extension panel disposed between the upper panel and the lower panel, the extension panel having a third junction part and a cross junction part intersecting the third junction part, the third junction part being coupled to the upper panel such that a part of the first junction part and the third junction part are overlapped, the third junction part and the first junction part being welded at a preceding weld, a remaining part of the second junction part being overlapped with the cross junction part, and the upper panel and the extension panel being welded to the lower panel at a following weld at each of the overlapped parts; and
a rigidity-reinforcing part formed on the upper panel, the extension panel, or the lower panel adjacent to a point where the preceding weld and the following weld intersect each other.

15. A component produced by welding, the component comprising:
a first part in which a first junction part is configured;
a second part in which a second junction part and a cross junction part intersecting the second junction part are configured, the second junction part being coupled to the first part such that a part of the first junction part and the second junction part are overlapped, and the second junction part and the first junction part are welded at a preceding weld; and
a third part in which a third junction part is configured, a part of the third junction part is overlapped with an opposite part of the first junction part, a remaining part of the third junction part is overlapped with the cross junction part, and the first part and the second part are welded to the third part at a following weld at each of the overlapped parts, wherein a rigidity-reinforcing part is formed on the first part, the second part, or the third part adjacent to a point where the preceding weld and the following weld intersect each other, and wherein the rigidity-reinforcing part is formed at a position between the second junction part and the cross junction part, the position being where the second junction part and the cross junction part meet each other in the second part.

16. The component of claim 15, wherein the rigidity-reinforcing part is formed at a position inclined toward the second junction part between the second junction part and the cross junction part.

17. The component of claim 15, wherein the rigidity-reinforcing part is positioned to be inclined toward the second junction part from a point between the second junction part and the cross junction part, and is in a groove shape recessed to a certain depth so as to be connected to the second junction part.

18. The component of claim 15, wherein, in the second part, the second junction part and the cross junction part are spaced apart from each other at all points except points where the second junction part and the cross junction part meet each other, and a plurality of rigidity-reinforcing parts is formed at a certain interval between the second junction part and the cross junction part spaced apart from each other.

19. The component of claim 15, wherein the first part is an upper panel of an outer panel assembly of a tailgate of a vehicle, the third part is a lower panel of the outer panel assembly of the tailgate, and the second part is an extension panel disposed between the upper panel and the lower panel of the outer panel assembly of the tailgate.

20. The component of claim 6, wherein the second junction part and the cross junction part are configured by dividing a section along an edge of the second part, whereby the second junction part and the cross junction part intersect each other at a point where the second junction part and the cross junction part meet each other.

* * * * *